United States Patent [19]

Morton et al.

[11] 3,759,966
[45] Sept. 18, 1973

[54] POLYMERIC TIN MERCAPTIDES

[75] Inventors: Paul Daniel Morton, Malvern; Bernard Buchholz, Blue Bell, both of Pa.

[73] Assignee: Pennwalt Corporation, Philadelphia, Pa.

[22] Filed: May 25, 1971

[21] Appl. No.: 146,811

[52] U.S. Cl. ................. 260/429.7, 260/45.75 K
[51] Int. Cl. ........................................... C 07 f 7/22
[58] Field of Search ............................. 260/429.7

[56] References Cited
UNITED STATES PATENTS

| | | | |
|---|---|---|---|
| 3,646,081 | 2/1972 | Buchholz | 260/429.7 |
| 3,424,717 | 1/1969 | Gottlieb | 260/45.75 K |
| 3,442,806 | 5/1969 | O'Neill | 260/45.75 K |
| 3,530,069 | 9/1970 | O'Neill | 260/45.75 K |
| 2,731,484 | 1/1956 | Best | 260/429.7 |

Primary Examiner—Helen M. S. Sneed
Attorney—Robert G. Danehower

[57] ABSTRACT

Polymeric tin mercaptides of the structure:

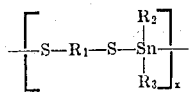

where $R_1$ is the hydrocarbon residue of a cycloaliphatic dimercaptan, $R_2$ and $R_3$ are alkyl groups of four to about 10 carbon atoms, and $x$ is an integer from about 2 to about 10, are complexed with a phenolic antioxidant. The resultant complexes are useful as non-toxic thermal stabilizers for polymers such as polyvinyl chloride.

19 Claims, No Drawings

POLYMERIC TIN MERCAPTIDES

This invention relates to stabilizers for vinyl halide polymer compositions. More particularly, this invention concerns improved tin mercaptide stabilizers for vinyl chloride polymers.

In copending application, Ser. No. 860,094 - Novel Polymeric Tin Mercaptides, Buchholz, filed Sept. 22, 1969, now U.S. Pat. No. 3,646,081, a new group of polymeric tin mercaptides was disclosed which were found to stabilize vinyl halide polymers against thermal degradation and also to exibit considerably lower toxicity than conventional tin mercaptide stabilizers used with vinyl halide polymers.

These polymeric tin mercaptides disclosed in Ser. No. 860,094 have the general structure shown below:

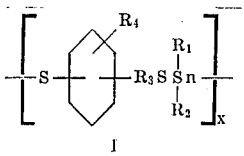

where $R^1$ and $R^2$ are alkyl of about 4 to 10 carbons; $R^3$ is alkylene of about 2 to 4 carbons; $R^4$ is H or lower alkyl; and, $x$ is integer from about 2 to about 10

Compounds of structure I have the advantages in polyvinyl chloride of being superior long-term stabilizers and of having surprisingly low toxicity. When $R_1 = R_2 = n\ -C_8H_{17}$. $R_4$ is H and $R_3$ is $CH_2 - CH_2$ as in structure III, for example, the product is completely non-toxic when administered orally to mice at the maximum dosage of 10 g./kg. By virtue of their polymeric structure these products have higher molecular weights than conventional $R_2Sn(SR')_2$ type tin mercaptide stabilizers, giving them the added benefits in polyvinyl chloride of lower volatility, lower migration and lower leaching rates.

One important quality lacking in these products, however, compared to tin mercaptides currently being marketed as polyvinyl chloride stabilizers, is ability to inhibit early yellowing of polyvinyl chloride in accelerated oven tests conventionally used to measure stabilizer efficiency. Polyvinyl chloride containing commercial tin mercaptide stabilizers such as Thermolite 31 or Thermolite 831 (M & T Corporation) remain colorless for a relatively longer period of time, while polyvinyl chloride containing an equal quantity of I acquires a slight yellow color during the early period of the accelerated oven tests. This deficiency is undesirable, since it results in discoloration of a polyvinyl chloride article during fabrication, particularly during high temperature fabricating processes such as blow-molding of bottles. The standard commercial tin mercaptide stabilizers have the following structure: Thermolite 31 (n $-CH_4H_9)_2Sn(SCH_2COO$ $-$ iso $C_8H_{17})_2$, Thermolite 831 (n$-C_8H_{17})_2Sn(SCH\ COO$ $-$ iso $C_8H_{17})_2$.

It is known that phenolic antioxidants impart yellowing resistance to polyvinyl chloride formulations especially resistance to early yellowing, i.e., the discoloration that occurs during the first 15–20 minutes a polyvinyl chloride formulation is exposed to temperatures of about 380°F. in polyvinyl chloride oven tests.

We have observed that when a polyvinyl choride resin is blended with a mixture of a phenolic antioxidant and the tin mercaptide of structure I, a marked detrimental effect on the long term stabilization results. Improved resistance to early yellowing is observed but apparently at the expense of decreased long term stabilization. Because of this defect, polyvinyl chloride resins having both the long term stabilization qualities which result from use of tin mercaptides of structure I and also having resistnace to early yellowing are not available.

SUMMARY OF THE INVENTION

We have found that a stabilizer which imparts resistance to early yellowing and which also is a long term thermal stabilizer results when phenolic anitoxidants are introduced directly into the reaction mixtures during preparation of the polymeric tin mercaptides having the structure I. Analytical data indicate that the resulting stabilizer contains the phenolic antioxidant in a loose complex with the polymeric tin mercaptide. Thin layer chromatograms of the complex product show two components corresponding to the phenolic antioxidant and the tin mercaptide. Infrared analysis show hydroxyl group absorption at 2.94 micrcns due to the phenolic antioxidant. Solubility studies reveal some type of association between the phenolic antioxidant and the tin mercaptide. For example, the complex product is completely soluble in hexane whereas the phenolic antioxidants alone are insoluble. The resulting tin mercaptide complexed with a phenolic antioxidant imparts excellent early yellowing resistance and superior long term thermal stability to polyvinyl chloride resins compared with other commercial tin mercaptide stabilizers. A mixture of the two components which results from adding the antioxidant to the polymeric tin mercaptide, does not impart comparable long term stability to polyvinyl chloride.

The amount of stabilizer incorporated in the polyvinyl chloride will be an amount effective to provide stabilization against heat degradation. Generally, this will be from about one-half to about five percent by weight of the final resin mixture. Preferably, about 1 to 3 percent will give satisfactory stabilization.

The tin mercaptide-phenolic complex can be added to the polyvinyl chloride by conventional dry blending followed by extruding or milling operations.

A single tin mercaptide-phenolic complex may be used to stabilize polyvinyl chloride while mixtures of the stabilizers are equally effective in providing long term heat stability.

The preferred tin mercaptides are II and III shown below wherein $x$ is an integer of from about 2 to about 10. The preferred phenolic antioxidant is Topanol CA, a 3:1 condensate of 2-tert-butyl-5-methyl-phenol and crotonaldehyde marketed by Imperial Chemical Industries.

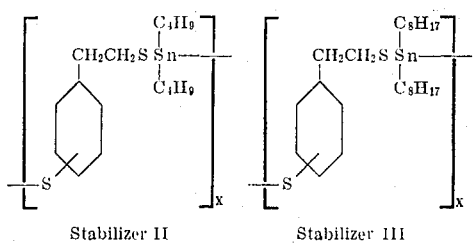

Stabilizer II      Stabilizer III

The preparation of the polymeric tin mercaptide of this invention is carried out in an inert solvent. Suitable solvents include the higher boiling aliphatic hydrocarbon solvents such as heptane, hexane, etc., and aromatic solvents such as benzene, toluene, xylene. When water is formed, it is preferable to carry out the reaction with a solvent that forms an azeotrope with the by-product water which is formed, e.g., when dialkyltin oxides are employed as a source of the tin. When a tin salt is used, an acid acceptor such as sodium carbonate is generally included in the formulation. These acid acceptors may be either washed out after the reaction leading to the stabilizer is completed or may be filtered off from the solution of the compound in the solvent. A polymeric product is finally isolated by distilling or evaporating the solvent employed.

DESCRIPTION OF THE PREFERRED EMBODIMENTS

The compounds of this invention are complexes formed between the polymeric tin mercaptide and the phenolic anitoxidant during the preparation of the polymeric tin mercaptide. This complex is not formed when the phenolic antioxidant is either mixed with the polymeric tin mercaptide or included in a formulation with unstabilized polyvinyl chloride and polymeric tin mercaptide.

The stabilizers of this invention are prepared by reacting an aliphatic dimercaptan of the structure:

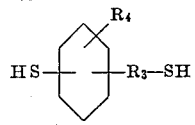

where $R_4$ is H or lower alkyl, $R_3$ is alkylene of about two to four carbons
with a dialkyltin compound of the formula:

$$R_1 R_2 Sn X$$

where $R_1$ and $R_2$ are alkyl of about four to 10 carbons and X is selected from the group consisting of oxygen, dihalide and dicarboxylate,
in the presence of 1 to 30 percent by weight based on the final product, of a phenolic antioxidant.

These reactions are carried out as indicated by the equations below (ArOH = phenolic anitoxidant)

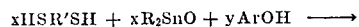

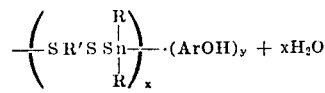

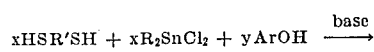

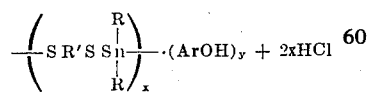

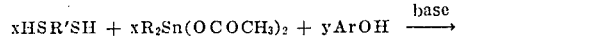

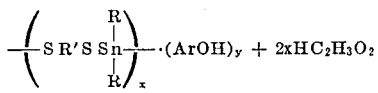

Preferably, the aliphatic dimercaptan is betamercapto-ethyl-3-(and 4) mercapto-cyclohexane.

The dimercaptan and the tin compound will react in equal molar quantities although a slight excess of either will not interfere with the reaction.

Typical dialkyltin compounds are dibutyltin oxide, dihexyltin oxide, dioctyltin oxide, didecyltin oxide, dibutyltin dichloride, diamyltin dichloride, diheptyltin dibromide, dioctyltin dibromide, dibutyltin diacetate, dipentyltin diacetate, dihexyltin dipropionate, dioctyltin diformate and didecyltin dibutyrate.

The phenolic antioxidants useful in the invention include the aliphatic mono and poly phenols and include disphenols, tris-phenols and tetrakis-phenols. All of these phenols are substituted with one or more aliphatic hydrocarbons, generally of $C_1$ through $C_{10}$ range.

Monohydric phenols useful in the invention include those disclosed in U.S. Pat. No. 2,581,907 and include the following:

2,4-dimethyl-6-t-butylphenol;
2,4-dimethyl-6-(alpha, alpha, gamma, gamma-tetramethylbutyl) phenol;
2,6-di-t-butyl-4-methylphenol
2-methyl-4,6-di-t-butylphenol
2,6-di-t-butyl-4-sec-butylphenol
2,4,6-tri-t-butylphenol
2,4,6-triethylphenol
2,4,6-tri-n-propylphenol
2,4,6-triisopropylphenol
2,6-di-t-octyl-4-propylphenol
2,6-di-t-butyl-4-ethylphenol
2,4-dicyclohexyl-6-methylphenol
2-isopropyl-4-methyl-6-t-butylphenol
2,4-dimethyl-6-t-amylphenol
2,4-di-t-amyl-6-methylphenol
2,6-di-t-butyl-4-isopropylphenol
2,6-di-t-amyl-4-methylphenol
2,6-di-t-amyl-4-isopropylphenol
2,4-diisopropyl-6-t-butylphenol, and
2,4-diisopropyl-6-sec-hexylphenol.

The preferred compounds of this class are those which have secondary or tertiary alkyl groups at the 2- and 6-position and a normal alkyl group at the 4-position, a representative of this class being 2,6-di-t-butyl-p-cresol. More preferably, the normal alkyl group in the 4-position is one containing from about one to 20 carbon atoms while the secondary or tertiary alkyl groups in the 2- and 6 positions each contain from about three to 20 carbon atoms. Any of the dialkylphenols are suitable; particularly preferred is the 2,6-di-t-butylphenol. The bisphenols are characterized by the general formula

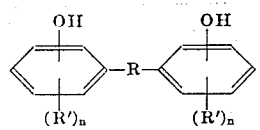

wherein R is an alkylidene radical of one to five carbon atoms, or is an ether or thioether group, and wherein R' is an alkyl group of one to 12 carbon atoms and n is an integer from 1 to 3. When more than one R' substituent is present on a phenol group, each R' can be the same or different.

Exemplary of these bisphenols, also called alkylidene-bis(alkylphenols), that may be used are 2,2'-methylene-bis(5-isopropylphenol),
2,2'-methylene-bis(4-methyl-6-isopropylphenol),
2,2'-methylene-bis(4-methyl-6-t-butylphenol)
2,2'-methylene-bis(4-t-butyl-6-methylphenol)
2,2'-methylene-bis(4,6-di-t-butylphenol)
2,2'-methylene-bis(4-nonylphenol)
4,4'-methylene-bis(2,6-di-t-butylphenol)
2,2'-isopropylidene-bis(5-methylphenol)
4,4'-methylene-bis(2-methyl-6-t-butylphenol)
2,2'-ethylidene-bis(4-methyl-6-t-butylphenol)
2,2'-ethylidene-bis(4,6-di-t-butylphenol)
2,2'-ethylidene-bis(4-octylphenol)
2,2'-ethylidene-bis(4-nonylphenol)
2,2'-isopropylidene-bis(4-methyl-6-iospropylphenol)
2,2'-isopropylidene-bis(4-isopropylphenol)
2,2'-isopropylidene-bis(4-isopropyl-6-methylphenol)
2,2'-isopropylidene-bis(4-methyl-6-t-butylphenol)
2,2'-isopropylidene-bis(4-octylphenol)
2,2'-isopropylidene-bis(4-nonylphenol)
2,2'-isopropylidene-bis(4-decylphenol)
4,4'-isopropylidene bisphenol
2,2'-isobutylidene-bis(4-methyl-6-t-butylphenol)
2,2'-isobutylidene-bis(4-nonylphenol)
4,4'-butylidene-bis(3-methyl-6-t-butylphenol)
1,1'-thiobis-(2-naphthol)
Bis(3,5-di-tert-butyl-4-hydroxybenzyl) ether
2,2'-thiobis-(4-methyl-6-tert-butylphenol)
4,4'thiobis-(5-methyl-2-tert-butylphenol)

Of the tris-phenols useful 1,3,5-trimethyl-2, 4, 6-tris(3,5-di-tertiary-butyl-4-hydroxybenzyl) benzene, 1,3,5 -trimethyl-2,4,6-tris(3,5-di-isopropyl-4-hydroxybenzyl)benzene; the 3:1 condensate of 2-t-butyl-5-methyl-phenol and crotonaldehyde (Topanol CA), and the like are typical.

Tetrakis-phenols useful are exemplified by compounds such as those of structure

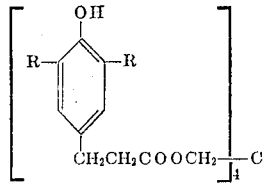

where R is lower alkyl, Preferred within this group is the compound where R is t-butyl. These phenolic compounds are prepared by methods well known in the art.

The preparation of polymeric tin mercaptides is more fully described in Ser. No. 860,094 — Novel Polymeric Tin Mercaptides—Buchholz, filed Sept. 22, 1969. The following examples are illustrative of the method of preparation of those compounds disclosed in Ser. No. 860,094.

EXAMPLE I

Dibutyltin vinylcyclohexene dimercaptide

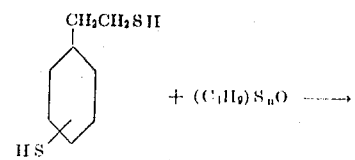

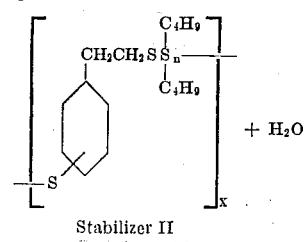

A solution of 21,65 g. (0.123 mol) of beta-mercaptoethyl-3(and 4)-mercaptocyclohexane (vinylcyclohexene dimercaptan) and 30.56 g. (0.123 mol) of dibutyltin oxide in 350 cc. of toluene was refluxed until water was no longer formed, as determined with a Barrett water trap. The toluene was removed, giving 48.8 g. (97.5 percent) of viscous, pale yellow product soluble in ether, benzene, acetone, hexane, insoluble in water and ethanol and having a refractive index of 1.5804 $D^{25}$.

Molecular weight determination is difficult because of dissociation in the solvents used for measurement, but the results indicated x had a value of at least 2 or 3.

Analysis:
Calculated: C, 47.2; H, 7.9; S, 15.7; Sn, 29.1
Found: C, 47.4; H, 8.3; S, 15.5; Sn, 28.2

EXAMPLE II

Dioctyltin vinylcyclohexene dimercaptide

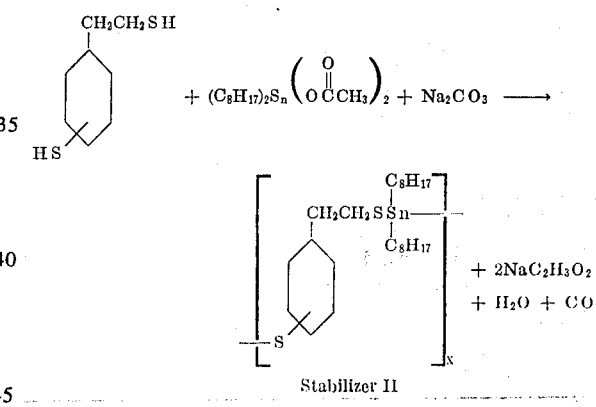

Using equimolar quantities of vinylcyclohexene dimercaptan and dioctyltin diacetate and excess sodium carbonate in toluene, the product was obtained as a viscous, yellow liquid in 88 percent yield. Solubility properties are the same as those of the product of Example 1. Refractive index of the product was 1.5476 $D^{25}$ and a molecular weight determination showed x to be greater than I. Analysis:

Calculated: C, 55.49; H, 9.31; Sn, 22.85
Found: C, 55.56; H, 9.49; Sn, 21.9

EXAMPLE III

Dibutyltin d-limonene dimercaptide

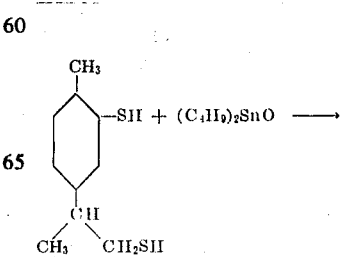

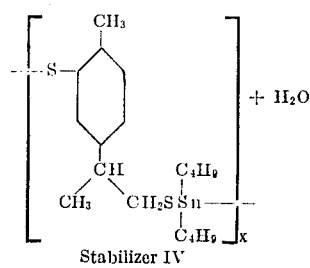

Stabilizer IV

Equimolar quantities of d-p-menthane-2,9-dithiol (d-limonene dimercaptan) and dibutyltin oxide were reacted as in 1 above, to give an 87 percent yield of the viscous, pale yellow product having a refractive index of 1.5658 $D^{25}$. Molecular weight determination in a benzene solution gave a value of 836 which decreased with time, indicating gradual dissociation of the polymeric product in the solvent (benzene). Analysis:

Calculated: C, 49.66; H, 8.34; S, 14.7; Sn, 27.3
Found: C, 48.3; H, 8,36; S, 13.6; Sn, 26.6

As previously indicated, these compounds have very surprising toxicological properties.

Acute oral toxicity studies in mice showed that the compound of Example II was completely non-toxic at dosage levels as high as 10 grams/kg. An acute subcutaneous toxicity determination gave an $LD_{50}$ value greater than 10 grams/kg. for the Example II product.

The following examples illustrate the preparation of the complexes of this invention:

EXAMPLE IV

Stabilizer A (Octyltin type)

Reflux a solution of 0.5 mol of beta-mercaptoethyl-3(and 4)-mercaptocyclohexane (vinylcyclohexene dimercaptan), 0.5 mol of dioctyltin oxide and 34.6 grams of Topanol CA in one liter of toluene for about 2 hours. Topanol CA is a trademark for an Imperial Chemical Industries antioxidant. It is a 3:1 condensate of 2-t-butyl-5-methylphenol and crotonaldehyde. It's structure is believed to be as follows:

During reflux remove the by-product water formed in the reaction by azeotropic distillation with toluene. The water may be collected or isolated by means of a Dean-Stark trap. Filter the resulting solution and remove the toluene under vacuum. About 288 grams of a clear viscous liquid results which contains about 13 percent complexed Topanol CA. Analysis of the product shows it to be 20.7 percent tin, compared with 21.9 percent tin for the analogous product prepared without Topanol CA, as in Example II. The complex product is soluble to more than 0.13 grams/cc in hexane, whereas Topanol CA above is relatively insoluble (less than 0.05 g. dissolving in 100 cc of hexane). Infra red analysis of the complex product shows strong absorption in the 2.95 microns region, characteristic of the phenolic hydroxyl group. The Example II product shows no absorption in this region.

When Topanol CA is added to a solution of the polymeric tin mercaptide II in hexane, the Topanol remains insoluble in the hexane and does not form the complex product of this invention.

EXAMPLE V

Stabilizer B (butyltin type)

Reflux a mixture of 0.4 moles of beta-mercaptoethyl-3(and 4)-mercaptocyclohexane (vinylcyclohexene dimercaptan), 0.4 moles of dibutyl-tin diacetate, 0.45 mols of sodium carbonate and 10.4 grams of the 3:1 condensate of 2-t-butyl-5-methylphenol and crotonaldehyde (sold as Topanol CA) in one liter of toluene for a period of 2.5 hours. Wash the reaction mixture with water, filter, and remove the toluene under vacuum. About 164 grams of viscous liquid results which contains about 6.5 percent complexed Topanol CA. Analysis of this liquid reveals it is 27.4 percent tin, compared to 28.0 percent and 28.2 percent tin formed in the analogous product prepared without Topanol CA in Example I. Infrared analysis shows strong hydroxyl group absorption in the 2.95 micron region, while the products of Example I show no absorption in this region.

EXAMPLE VI

Stabilizer C (butyltin type)

Reflux a mixture of 0.13 mol of beta-mercaptoethyl-3(and 4)-mercaptocyclohexane (vinylcyclohexene dimercaptan), 0.13 mol of dibutyltin diacetate, 15.7 grams of sodium carbonate, 6.9 grams of 4,4'isopropylidene bisphenol sold as Bisphenol A and 346 grams of toluene for two hours. Wash the reaction mixture with water, filter it, then remove the toluene under vacuum by evaporation or distillation. About 57 grams of polymeric butyltin mercaptide complexed with about 13 percent Bisphenol A is obtained.

STABILIZER EVALUATIONS

Plasticized polyvinyl chloride sheets 40 mils thick were prepared on a hot two-roller mill using two parts of unstabilized polyvinyl chloride resin to one part of dioctylphthalate (DOP) plasticizer plus the appropriate amount of tin mercaptide stabilizer, usually 1.5 percent based on the final composition. For oven tests 1, 2, and 4, the appropriate amount of phenolic antioxidant was also blended into the polyvinyl chloride formulation by hot milling. Test samples were stamped from the sheets and placed on aluminum trays in an air-circulating oven maintained at 375° or 380°F. The discoloration rates of the polyvinyl chloride samples were compared with the commercial standards — Thermolite 31 [dibutyltin S,S'-bis(isooctylthioglycolate)] and Thermolite 831 [dioctyltin S,S'-bis(isooctylthioglycolate)].

COLOR KEY

C = Colorless  
VPY = very pale yellow  
LY = light yellow  
Y = yellow  
A = amber  
BE = brown edge  
B = brown  
BLK = black

EXAMPLE VII

Oven Test No. 1

A mechanical mixture of 1.5 percent stabilizer III, (octyltin mercaptide, prepared as in Example II) and 0.5 percent various phenolic antioxidants is prepared by milling into polyvinyl chloride resin along with dioctylphthalate plasticizer. Note improved early color, but decreased long-term stabilization where a mechanical mixture of III and a phenolic antioxidant are employed compared to use of the octyltin mercaptide III without a phenolic antioxidant.

OVEN TEST NO. 1

| Phenolic anti-oxidant | Tin stabilizer | | | | | | | |
|---|---|---|---|---|---|---|---|---|
| | Thermo-lite 831 (standard) | III | III | III | III | III | III | III |
| | None | None | (1) | (2) | (3) | (4) | (5) | (6) |
| Minutes at 380° F.: | | | | | | | | |
| 5 | C | VPY | C | C | C | C | VPY | VPY |
| 10 | C | LY | C | C | C | C | VPY | VPY |
| 15 | C | LY | VPY | VPY | VPY | VPY | VPY | VPY |
| 20 | C | LY | VPY | VPY | VPY | VPY | VPY | VPY |
| 25 | VPY | LY | VPY | VPY | VPY | VPY | VPY | VPY |
| 30 | VPY | LY | LY | LY | LY | LY | LY | LY |
| 45 | VPY | LY | Y | Y | Y | Y | Y | Y |
| 65 | Y | LY | Y | BLK | A | A | Y | Y |
| 85 | B | Y | A | BLK | BLK | BLK | Y | Y |
| 105 | B | A | B | BLK | BLK | BLK | B | B |
| 120 | B | B | BLK | BLK | BLK | BLK | B | B |

NOTES.—(1)=CAO-7 (Ashland Chemical Co., Tert-butyl substituted-4-methoxyphenol; (2)=Topanol CA (I.C.I.), 3:1 condensate of 2-t-butyl-4-methylphenol and crotonaldehyde; (3)=Santowhite Power (Monsanto), 4,4′butylidene-bis (3-methyl-6-t-butylphenol); (4)=Santowhite Crystals (Monsanto), 4,4′-thiobis (3-methyl-6-t-butylphenol); (5)=Antioxidant 2246 (American Cyanamid), 2,2′-methylene-bis (4-methyl-6-t-butylphenol); (6)=Bisphenol A (Dow, Monsanto) 4,4′-isopropylidene-bisphenol.

EXAMPLE VIII

Oven Test No. 2

A mechanical mixture of 1.5 percent stabilizer III (octyltin mercaptide prepared as in Example II) and 0.2 percent Topanol CA is prepared by milling into polyvinyl chloride resin along with dioctylphthalate plasticizer. Early color of the mixture is improved, over III alone, but long-term performance of the mixture is decreased compared to III alone.

OVEN TEST NO. 2

| Minutes at 375°F. | 1.5% Stabilizer III | 1.5% III + 0.2% Topanol CA | 1.5% Thermolite 831 (Standard) |
|---|---|---|---|
| 5 | C | C | C |
| 10 | VPY | C | C |
| 15 | VPY | C | C |
| 20 | LY | C | C |
| 25 | LY | C | C |
| 30 | LY | VPY | C |
| 45 | LY | Y | VPY |
| 60 | LY | Y | VPY |
| 75 | Y | Y | Y |
| 95 | Y | BE | B |
| 115 | B | BLK | B |

EXAMPLE IX

Oven Test No. 3

Stabilizer A(octyltin mercaptide III containing 13 percent complexed Topanol CA)prepared as in Example IV is milled into polyvinyl chloride along with dioctylphthalate plasticizer. Note that long-term stabilization is better than use of Thermolite 831 while yellowing is comparable.

OVEN TEST NO. 3

| Minutes at 375°F. | 1.5% Stabilizer A | 1.7% Stabilizer A(*) | 1.5% Thermolite 831 (Standard) |
|---|---|---|---|
| 5 | C | C | C |
| 10 | C | C | C |
| 15 | C | C | C |
| 20 | C | C | C |
| 25 | C | C | C″ |
| 30 | C | C | C |
| 60 | LY | LY | VPY |
| 80 | LY | LY | Ly |
| 100 | Y | Y | BE |
| 120 | BE | Y | B |
| 135 | B | B | B |

(*) Equivalent to about 1.5% tin mercaptide and 0.2% Topanol CA in the final PVC resin.

EXAMPLE X

Oven Test No. 4

A mechanical mixture of 1.5 percent stabilizer II (butyltin mercaptide) prepared as in Example I and 0.5 percent phenolic antioxidant is prepared by milling into polyvinyl chloride resin along with the doctylphthalate plasticizer. Early discoloration of the mixture of butyltin mercaptide and an antioxidant is improved over butyltin mercaptide alone but long-term stabilization of the mixtures are poorer than II alone.

OVEN TEST NO. 4

| Minutes at 380°F. | 1.5% Thermo-lite 31 | 1.5% Stabilizer II | 1.5% II + 0.5% Antioxidant 2246 | 1.5% II + 0.5% Bisphenol A |
|---|---|---|---|---|
| 10 | C | LY | VPY | C |
| 20 | C | LY | VPY | C |
| 30 | C | LY | LY | VPY |
| 45 | VPY | LY | LY | LY |
| 60 | LY | LY | Y | LY |
| 75 | Y | LY | Y | Y |
| 90 | BE | LY | Y | Y |
| 105 | B | LY | Y | Y |
| 120 | B | Y | A | BE |
| 150 | B | B | B | BLK |

EXAMPLE XI

Oven Test No. 5

1.5 percent of stabilizer C(butyltin mercaptide II) containing 13 percent complexed Bisphenol A prepared as in Example VI is milled into polyvinyl chloride resin along with the dioctylphthalate plasticizer. Early yellowing of C is improved without loss of long-term stabilization compared to II alone or the resin stabilized with Thermolite 31.

OVEN TEST NO. 5

| Minutes at 375°F. | 1.5% Thermolite 31 | 1.5% Stabilizer II | 1.5% Stabilizer C |
|---|---|---|---|
| 5 | C | C | C |
| 10 | C | C | C |
| 15 | C | VPY | VPY |
| 20 | C | LY | VPY |
| 25 | C | LY | VPY |
| 30 | C | LY | VPY |
| 45 | C | LY | LY |
| 75 | VPY | LY | LY |
| 105 | B | Y | Y |
| 120 | B | Y | Y |
| 145 | B | B | B |

EXAMPLE XII

Oven Test No. 6

1.5 percent of stabilizer B (butyltin mercaptide II) containing 6.5 percent complexed Topanol CA prepared as in Example V is milled into polyvinyl chloride resin along with dioctylphthalate plasticizer. Improved early and long-term stabilization is obtained with the butyltin mercaptide complexed with phenolic antioxidant as compared to stabilizer II (without the complex) or Thermolite standard.

OVEN TEST NO. 6

| Minutes at 375°F. | 1.5% Thermolite 31 | 1.5% Stabilizer II | 1.5% Stabilizer B |
|---|---|---|---|
| 5 | C | C | C |
| 10 | C | C | C |
| 15 | C | VPY | C |
| 20 | C | LY | VPY |
| 25 | C | LY | VPY |
| 30 | C | LY | VPY |
| 60 | LY | LY | LY |
| 90 | B | LY | LY |
| 110 | B | Y | LY |
| 130 | B | Y | LY |
| 160 | B | B | BE |

EXAMPLE XIII

Stabilizer D (butyltin type)

A solution containing 0.5 mol of beta-mercaptoethyl-3 (and 4) -mercaptocyclohexane, 0.5 mol of dibutyltin oxide and 30.5 g. of Ionol (2,6-ditertiary-butyl-4-methylphenol, Shell Chemical Co.) in one liter of toluene is refluxed with azeotropic removal of water. After stripping the solvent, 234 g. of product containing about 15 percent of associated Ionol is obtained as a viscous liquid.

EXAMPLE XIV

Oven Test No. 7

About 1.5 percent of stabilizer D is milled into polyvinyl chloride resin along with dioctylphthalate plasticizer. Oven Tests, as previously described at 380°F. were conducted. The stabilizer D — polyvinyl chloride sheets were compared with polyvinyl chloride stabilized only with the polymeric dibutyltin mercaptide of Example I. Improved resistance to early yellowing is observed for the polyvinyl chloride resin stabilized with stabilizer D, compared to the resin stabilized with the polymeric dibutyltin mercaptide with no loss in long term stabilization of the resin.

EXAMPLE XV

Stabilizer E (Butyltin Type)

A solution containing 0.5 mol of d-limonene dimercaptan, 0.5 mol of dibutyltin oxide and 7.7 g of Irganox 1010* (Geigy Chemical Co.) in 1 liter of toluene is refluxed with azeotropic removal of water. Stripping the solvent gives 225 g. of product containing about 3.5 percent of associated Irganox 1010 as a viscous liquid.

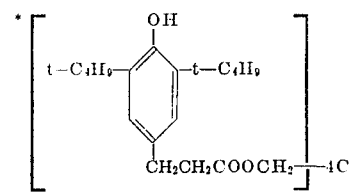

EXAMPLE XVI

Oven Test No. 8

Stabilizer E is milled into polyvinyl chloride resin with dioctylphthalate plasticizer as previously shown. Samples of the Stabilizer E polyvinyl chloride resin were compared in an oven set at 380°F, with dibutyltin mercaptide polyvinyl chloride mixture. Improved resistance to early yellowing was observed for the polyvinyl chloride containing stabilizer E without loss of long term stabilization.

We claim:

1. A thermal stabilizer for polyvinyl chloride in the form of a tin mercaptide polymer complexed with a phenolic antioxidant obtained by reacting an aliphatic dimercaptan of the structure:

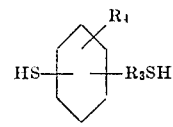

where $R_4$ is H or lower alkyl, $R_3$ is alkylene of about two to four carbons;

with a dialkyltin compound of the structure:

$$R_1 R_2 Sn X$$

where $R_1$ and $R_2$ are alkyl of about four to 10 carbons and X is selected from the groups consisting of oxygen, dihalide or dicarboxylate, in the presence of a phenolic antioxidant selected from the group consisting of alkyl substituted monophenols, alkyl substituted bisphenols, alkyl substituted trisphenols and alkyl substituted tetrakisphenols.

2. The stabilizer of claim 1 in which the cycloaliphatic mercaptan reactant is betamercaptoethyl-3(and 4)-mercaptocyclohexane.

3. The stabilizer of claim 1 in which the cycloaliphatic dimercaptan reactant is 2,9-p-menthanedithiol.

4. The stabilizer of claim 1 in which the dialkyltin compound is dibutyltin oxide.

5. The stabilizer of claim 1 in which the dialkyltin compound is dioctyltin oxide.

6. The stabilizer of claim 1 in which the phenolic antioxidant reactant is 2,6-ditertiary-butyl-4-methylphenol.

7. The stabilizer of claim 1 in which the phenolic antioxidant reactant is 4,4'-isopropylidene bisphenol.

8. The stabilizer of claim 1 in which the phenolic antioxidant reactant is the 3 to 1 condensate of 2-tertiary-butyl-4-methylphenol and crotonaldehyde.

9. The stabilizer of claim 2 in which the dialkyltin compound is dibutyltin oxide.

10. The stabilizer of claim 2 in which the dialkyltin compound is dioctyltin oxide.

11. The stabilizer of claim 2 in which the phenolic antioxidant reactant is 2,6-ditertiary-butyl-4-methylphenol.

12. The stabilizer of claim 2 in which the phenolic antioxidant reactant is 4,4'-isopropylidene bisphenol.

13. The stabilizer of claim 2 in which the phenolic antioxidant reactant is the 3 to 1 condensate of 2-tertiary-butyl-4-methylphenol and crotonaldehyde.

14. The stabilizer of claim 9 in which the phenolic antioxidant reactant is 2,6-ditertiary-butyl-4-methylphenol.

15. The stabilizer of claim 9 in which the phenolic antioxidant reactant is 4,4'-isopropylidene bisphenol.

16. The stabilizer of claim 9 in which the phenolic antioxidant reactant is the 3 to 1 condensate of 2-tertiary-butyl-4-methylphenol and crotonaldehyde.

17. The stabilizer of claim 10 in which the phenolic antioxidant reactant is 2,6-ditertiary-butyl-5-methylphenol.

18. The stabilizer of claim 10 in which the phenolic antioxidant reactant is 4,4'-isopropylidene bisphenol.

19. The stabilizer of claim 10 in which the phenolic antioxidant reactant is the 3 to 1 condensate of 2-tertiary-butyl-4-methylphenol and crotonaldehyde.

* * * * *